United States Patent Office 3,698,999
Patented Oct. 17, 1972

3,698,999
FERMENTATIVE PREPARATION OF COENZYME A
Ichiro Chibata, Suita, Toshio Kakimoto, Sakai, and Takeji Shibatani and Noriyuki Nishimura, Kobe, Japan, assignors to Tanabe Seiyaku Co., Ltd., Osaka, Japan
No Drawing. Filed Mar. 2, 1971, Ser. No. 120,367
Claims priority, application Japan, Mar. 14, 1970, 45/21,862
Int. Cl. C12d 13/00
U.S. Cl. 195—29   12 Claims

ABSTRACT OF THE DISCLOSURE

A coenzyme A-producing microorganism selected from the group consisting of *Sarcina lutea*, *Sarcina aurantiaca*, *Microbacterium flavum* and *Micrococcus rubens* is cultivated in a nutrient medium under aerobic conditions and in the presence of pantothenic acid, adenine and cysteine. The cultivation is preferably carried out at about 30–37° C. and at a pH of 5.0–7.0. Preferably 0.5 w./v. percent of each of pantothenic acid, adenine and cysteine are employed. Coenzyme A is recovered from the fermentation broth.

---

This invention relates to the fermentative preparation of coenzyme A.

It is well known that coenzyme A is a useful and important compound in the metabolic processes of living cells. For example, it is useful in the metabolism of carbohydrates, fats and amino acids and in the biosynthesis of ferroprotoporphyrin. Methods for the production of this coenzyme are known. In one known method pantothenic acid and adenylic acid are employed as the starting materials (e.g., J. Am. Chem. Soc., 83, 663 (1961); Biochim. Biophys. Acta 50, 605 (1961); Chem. Pharm. Bull. 15, 655 (1967)). In another method coenzyme A is isolated from natural sources such as hog liver and yeast (e.g., J. Biol. Chem. 186, 235 (1959); Am. 574, 1 (1951)). However, these methods are not satisfactory for commercial scale production. The method employing pantothenic acid and adenylic acid as starting materials is complicated and the coenzyme A content in the tissues of hogs and in yeast is low.

Alternatively, there have also been disclosed in the prior art fermentative methods of preparing coenzyme A. In such methods a microorganism (e.g., *Candida tropicalis*, *Candida lipolytica*, *Brettanomyces rambicus*, *Arthrobacter simplex*, *Pseudomonas aeruginosa*, etc.) is cultivated using only hydrocarbon compounds as a source of carbon (Japanese patent publication Nos. 24,459/68 and 6,625/69). The amount of coenzyme A accumulated in the fermentation broth is about 120 to 150 μg./ml.

According to the present invention, coenzyme A is produced in a high yield by cultivating a coenzyme A-producing microorganism belonging to the Sarcina, Microbacterium or Micrococcus genera in a nutrient medium under aerobic conditions and in the presence of pantothenic acid, adenine and cysteine under, and recovering the accumulated coenzyme A from the fermentation broth.

Examples of the microorganisms which may be used in the present invention include *Sarcina lutea* IAM (Institute of Applied Microbiology, Tokyo University, Japan) No. 1099, *Sarcina aurantiaca* IFO (Institute for Fermentation, Osaka, Japan) No. 3064, *Microbacterium flavum* IAM No. 1642 and *Micrococcus rubens* IFO No. 3768. All of these microorganisms are publicly available from the depositories stated above.

The fermentation of each of the above-mentioned microorganisms may be conducted by either shaking cultivation or submerged fermentation under aeration. It is preferred to carry out the fermentation at 30° to 37° C. and at a pH of from 5.0 to 7.0. The nutrient medium is comprised of a carbon source or sources, a nitrogen source or sources and a small amount of an inorganic element or elements. Suitable sources of carbon for the fermentation process include glucose, maltose, sucrose, starch and molasses. The total amount of such sources to be contained in the medium should be about 5 to 10 w./v. percent. The amount of the nitrogen source and/or the inorganic element(s) in the nutrient medium may be varied with the fermentation conditions, the species of the microorganism employed and the nutrient source(s) employed. However, the fermentation of this invention may be readily carried out when the proportions of nitrogen source(s) and inorganic element(s) in the medium are respectively about 0.5 to 5 w./v. percent and about 0.001 to 3 w./v. percent. 1.1 to 4.4 w./v. percent of corn steep liquor, 0.5 to 2.0 w./v. percent of meat extract, 0.5 to 1.5 w./v. percent of peptone, yeast extract or casein hydrolysate, and 0.5 to 2.0 w./v. percent of ammonium sulfate, ammonium nitrate or potassium nitrate are preferably employed as the nitrogen source. Inorganic elements which may be employed include 0.5 to 3.0 w./v. percent of potassium phosphate, 0.02 to 0.5 w./v. percent of magnesium sulfate, 0.001 to 0.1 w./v. percent of manganese sulfate and 0.01 to 0.05 w./v. percent of calcium chloride.

When the present invention is carried out, 0.05 to 0.5 w./v. percent of each of pantothenic acid, adenine and cysteine, preferably 0.1 to 0.3 w./v. percent of pantothenic acid, 0.1 to 0.2 w./v. percent of adenine and 0.1 to 0.2 w./v. percent of cysteine are added to the fermentation medium. These compounds may be employed either in the form of the free base or as of a salt such as for example an alkali metal salt (e.g., sodium salt) or alkaline earth metal salt (e.g., calcium salt) of pantothenic acid, the an acid salt (e.g., hydrochloride) of adenine and an acid salt of cysteine. It is preferred to add the above-mentioned compounds to the medium at the stage between the latter half of the logarithmic growth phase and the early stationary phase of the fermentation, because the productivity of coenzyme A in the microorganisms reaches its maximum level during such stages. Alternatively, a part of these precursors of coenzyme A may be added at the above-mentioned stages and the remaining part of said precursors may be added thereafter. The fermentation of the medium can be accomplished in 2 to 5 days. During the course of the reaction the amount of coenzyme A accumulated in the medium reaches a level of approximately 500 to 700 μg./ml.

After the fermentation has been completed, mycelia and other solid culture compositions are removed from the fermentation broth by conventional procedures such as by heating, followed by filtration and/or centrifugation. Various known procedures may be employed in the recovery and/or purification of coenzyme A from the filtrate or the supernatant solution. For instance, activated carbon-adsorption, weak acidic ion exchange resin-adsorption, DEAE-cellulose-adsorption, DEAE-dextran gel-adsorption or a combination of these procedures can be advantageously employed. By these procedures, coenzyme A is obtained in an amount of 200 to 250 units/mg.

Practical and presently preferred embodiments of this invention are illustratively shown in the following examples. All percentages of the fermentation medium are by weight/volume. In the aforementioned and following descriptions, the activity of coenzyme A was measured by the phosphotransacetylase method described in "Methods in Enzymology, 1, 596 (1955)."

EXAMPLE 1

An aqueous nutrient medium comprising the following ingredients is prepared:

| | |
|---|---|
| Glucose | 5 |
| Corn steep liquor | 2.2 |
| Peptone | 1.35 |
| Monobasic potassium phosphate | 0.25 |
| Dibasic potassium phosphate | 0.25 |
| Magnesium sulfate hepta hydrate | 0.1 |

The above medium is adjusted to pH 7.0. 20 ml. of the medium is charged into a 500 ml. shakable flask and the flask and its contents are sterilized. *Sarcina lutea* IAM No. 1099 is cultivated for 20 hours in a medium comprising the same ingredients as stated above. 0.5 ml. of inoculum thus obtained is introduced into the sterilized medium. The cultivation is carried out for 48 hours at 30° C. with shaking at the rate of 140 rotations/minute. 25 mg. of calcium pantothenate, 25 mg. of adenine and 25 mg. of cysteine hydrochloride are added to the medium. The medium is diluted to 25 ml. with sterile water and is further shaken for 16 hours under the same conditions as described above. The medium thus obtained contains 650 µg./ml. of coenzyme A.

One liter of the medium is heated at 100° C. for 10 minutes and is then subjected to centrifugation. The supernatant solution (1150 ml.) containing 550 µg./ml. of coenzyme A is passed through a column (3× 14 cm.) of activated carbon. After washing with water, the column is eluted with a mixture consisting of 1 volume of 28% aqueous ammonia and 1000 volume of 40% aqueous acetone. The fractions containing coenzyme A are combined, concentrated to about 50 ml., and is then passed through a column (4× 20 cm.) of basic anion exchange resin (formate form) (manufactured by Dow Chemical Company under the trade name "Dowex 1 x 2"). The column is eluted with an aqueous solution containing 0.6 M concentration of formic acid and 0.3 M concentration of ammonium formate. The fractions containing the product are collected and concentrated under vacuum, and at 50° C., to about 10 ml. 90 ml. of acetone are added to the solution and the resultant precipitates are collected by filtration. 685 mg. (215 units/mg.) of coenzyme A are obtained.

EXAMPLE 2

20 ml. of a nutrient medium comprising the same ingredients as described in Example 1 is prepared. *Microbacterium flavum* IAM No. 1642 is cultivated by the procedure of Example 1. 0.5 ml. of inoculum thus produced is introduced into the medium. The cultivation is carried out for 48 hours at 30° C. with shaking at the rate of 140 rotations/minute. 25 mg. of calcium pantothenate, 25 mg. of adenine and 25 mg. of cysteine hydrochloride are added to the medium. The medium is diluted to 25 ml. with sterile water and is further shaken for 16 hours under the same condition as described above. The medium thus obtained contains 205 µg./ml. of coenzyme A.

One liter of the medium is treated in the same manner as described in Example 1. 225 mg. (208 units/mg.) of coenzyme A are obtained.

EXAMPLE 3

An aqueous nutrient medium comprising the following ingredients is prepared:

| | |
|---|---|
| Glucose | 5 |
| Meat extract | 1 |
| Yeast extract | 0.45 |
| Casein hydrolysate (manufactured by Difco Company under the trade name "Casamino Acid") | 0.55 |
| Peptone | 1.35 |
| Monobasic potassium phosphate | 0.25 |
| Dibasic potassium phosphate | 0.25 |
| Magnesium sulfate hepta hydrate | 0.1 |

The above medium is adjusted to pH 7.0. 20 ml. of the medium is charged into a 500 ml. shakable flask and the flask and its contents are sterilized. *Micrococcus rubens* IFO No. 3768 is cultivated for 20 hours in a medium comprising the same ingredients as stated above. 0.5 ml. of inoculum thus produced is introduced into the sterilized medium. The cultivation is carried out for 48 hours at 30° C. with shaking at the rate of 140 rotations/minute. 25 mg. of calcium pantothenate, 25 mg. of adenine and 25 mg. of cysteine hydrochloride are added to the medium. The medium is diluted to 25 ml. with sterile water and is further shaken for 16 hours under the same condition as described above. The medium thus obtained contains 240 µg./ml. of coenzyme A.

One liter of the medium is treated in the same manner as described in Example 1. 237 mg. (230 units/mg.) of coenzyme A are obtained.

EXAMPLE 4

An aqueous nutrient medium comprising the following ingredients is prepared:

| | |
|---|---|
| Glucose | 5 |
| Corn steep liquor | 2.2 |
| Yeast extract | 0.9 |
| Casein hydrolysate (manufactured by Difco Company under the trade name "Casamino Acid") | 0.9 |
| Monobasic potassium phosphate | 0.25 |
| Dibasic potassium phosphate | 0.25 |
| Magnesium sulfate hepta hydrate | 0.1 |

The above medium is adjusted to pH 7.0. 20 ml. of the medium is charged into a 500 ml. shakable flask and the flask and its contents are sterilized. *Sarcina aurantiaca* IFO No. 3064 is cultivated for 20 hours in a medium comprising the same ingredients as stated above. 0.5 ml. of inoculum thus produced is introduced into the sterilized medium. The cultivation is carried out for 72 hours at 30° C. with shaking at the rate of 140 rotations/minute. 25 mg. of calcium pantothenate, 25 mg. of adenine and 25 mg. of cysteine hydrochloride are added to the medium. The medium is diluted to 25 ml. with sterile water and is further shaken for 16 hours under the same condition as described above. The medium thus obtained contains 210 µg./ml. of coenzyme A.

One liter of the medium is treated in the same manner as described in Example 1. 214 mg. (230 units/mg.) of coenzyme A are obtained.

EXAMPLE 5

20 ml. of the nutrient medium comprising the same ingredients as described in Example 1 (except that 10% of sucrose is employed instead of glucose) is prepared. *Sarcina lutea* IAM No. 1099 is cultivated for 20 hours in a medium comprising the same ingredients as stated above. 0.5 ml. of inoculum thus produced is introduced into the sterilized medium. The cultivation is carried out for 48 hours at 30° C. with shaking at the rate of 140 rotations/minutes. 25 mg. of calcium pantothenate, 25 mg. of adenine and 25 mg. of cysteine hydrochloride are added to the medium. The medium is diluted to 25 ml. with sterile water and is further shaken for 16 hours under the same conditions as described above. The medium thus obtained contains 690 µg./ml. of coenzyme A.

One liter of the medium is treated in the same manner as described in Example 1. 776 mg. (216 units/mg.) of coenzyme A are obtained.

EXAMPLE 6

20 ml. of a nutrient medium comprising the same ingredients as described in Example 5 is prepared. *Sarcina lutea* IAM No. 1099 is cultivated by the procedure of Example 5. 0.5 ml. of inoculum thus produced is introduced into the medium. The cultivation is carried out for 48 hours at 30° C. with shaking at the rate of 140 rotations/minute. 25 mg. of calcium pantothenate, 25 mg. of adenine and 25 mg. of cysteine hydrochloride are added to the medium. The medium is diluted to 25 ml. with sterile water and is shaken for 20 hours under the same conditions as above. 25 mg. of each of calcium pantothenate, adenine and cysteine hydrochloride are added to the medium, and the medium is further shaken for 16 hours. The medium thus obtained contains 718 µg./ml. of coenzyme A.

One liter of the medium is treated in the same manner as described in Example 1. 797 mg. (218 units/mg.) of coenzyme A are obtained.

What is claimed is:

1. A process for preparing coenzyme A which comprises cultivating a coenzyme A-producing microorganism selected from the group consisting of *Sarcina lutea, Sarcina aurantiaca, Microbacterium flavum* and *Micrococcus rubens* in a nutrient medium, under aerobic conditions, and in the presence of pantothenic acid, adenine and cysteine to produce a fermentation broth, and recovering accumulated coenzyme A from the fermentation broth.

2. The process according to claim 1 wherein the microorganism is *Sarcina lutea* IAM No. 1099.

3. The process according to claim 1 wherein the microorganism is *Sarcina aurantiaca* IFO No. 3064.

4. The process according to claim 1 wherein the microorganism is *Microbacterium flavum* IAM No. 1642.

5. The process according to claim 1 wherein the microorganism is *Micrococcus rubens* IFO No. 3768.

6. The process according to claim 1 wherein the cultivation is carried out at about 30° to about 37° C. and at a pH of about 5.0 to 7.0.

7. The process according to claim 1 wherein the cultivation is carried out in the presence of about 0.05 to about 0.5 w./v. percent of each of pantothenic acid, adenine and cysteine.

8. The process according to claim 1 wherein the cultivation is carried out in the presence of 0.1 to 0.3 w./v. percent of pantothenic acid, 0.1 to 0.2 w./v. percent of adenine and 0.1 to 0.2 w./v. percent of cysteine.

9. The process according to claim 1 wherein the cultivation is carried out in the presence of about 0.05 to about 0.5 w./v. percent of each of pantothenic acid, adenine and cysteine at about 30° to about 37° C. and at a pH from about 5.0 to 7.0.

10. The process according to claim 1 wherein the cultivation is carried out in the presence of 0.1 to 0.3 w./v. percent of pantothenic acid, 0.1 to 0.2 w./v. percent of adenine and 0.1 to 0.2 w./v. percent cysteine at about 30° to about 37° C. and at a pH of about 5.0 to 7.0.

11. A process for preparing coenzyme A which comprises cultivating a coenzyme A-producing microorganism selected from the group consisting of *Sarcina lutea, Sarcina aurantiaca, Microbacterium flavum* and *Micrococcus rubens* in a nutrient medium, under aerobic conditions, to produce a fermentation broth, adding about 0.05 to about 0.5 w./v. percent of each of pantothenic acid, adenine and cysteine between the latter half of the logarithmic growth phase and the early stationary phase of the fermentation, and recovering accumulated coenzyme A from the fermentation broth.

12. The process according to claim 11 wherein said cultivation is carried out at a temperature of about 30° to about 37° C. and at a pH from about 5.0 to 7.0.

References Cited

The Biochemical Journal, vol. 56, pp. 130–135 (1954).

ALVIN E. TANENHOLTZ, Primary Examiner

U.S. Cl. X.R.

195—28 R